United States Patent
Balasaygun et al.

(10) Patent No.: US 11,832,149 B2
(45) Date of Patent: Nov. 28, 2023

(54) INTELLIGENT PARK AND PAGE FUNCTIONS IN A COMMUNICATION SYSTEM

(71) Applicant: Avaya Management L.P., Durham, NC (US)

(72) Inventors: Mehmet Balasaygun, Freehold, NJ (US); Christopher D. Baldwin, Princeton, NJ (US); Kurt Haserodt, Westminster, CO (US); David Chavez, Broomfield, CO (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/176,425

(22) Filed: Feb. 16, 2021

(65) Prior Publication Data

US 2022/0264259 A1  Aug. 18, 2022

(51) Int. Cl.
*H04W 4/12* (2009.01)
*H04W 4/16* (2009.01)

(52) U.S. Cl.
CPC ............... *H04W 4/12* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 7,408,925 B1 | 8/2008 | Boyle et al. | |
| 7,616,749 B2 | 11/2009 | Poustchi | |
| 7,801,743 B2 | 9/2010 | Graves et al. | |
| 8,582,733 B1 * | 11/2013 | Larson | H04M 3/42212 379/201.01 |
| 10,652,739 B1 | 5/2020 | Lilley et al. | |
| 2002/0137498 A1 * | 9/2002 | Goss | H04M 3/54 455/458 |
| 2005/0181767 A1 * | 8/2005 | Boland | H04M 3/537 455/433 |
| 2006/0240771 A1 * | 10/2006 | Graves | G16H 40/20 455/39 |
| 2014/0279014 A1 | 9/2014 | Roka et al. | |

FOREIGN PATENT DOCUMENTS

CN   108665294 A  * 10/2018  ......... G06Q 30/0208

OTHER PUBLICATIONS

"Call Park and Page Quick Reference," Avaya Inc., Apr. 2017, Release 3.0, Issue 1, 1 page.
"Call Park and Page Snap-in," Avaya Inc., 2015, 7 pages [retrieved online from: support.avaya.com/products/P1607/call-park-and-page-snapin].

* cited by examiner

*Primary Examiner* — Jinsong Hu
*Assistant Examiner* — Alexander J Yi
(74) *Attorney, Agent, or Firm* — Sheridan Ross P.C.

(57) ABSTRACT

The present disclosure provides a communication system and method, among other things. As a non-limiting example, the method includes receiving a call from a caller, parking the call, and while the call is parked, determining a paging target for the call. The method may further include paging a first target area in an attempt to summon the paging target to retrieve the parked call. The method may further include paging a second target area in an attempt to summon the paging target to retrieve the parked call, receiving a response from the paging target, and based on the response received from the paging target, connecting the paging target with the caller.

20 Claims, 7 Drawing Sheets

INTELLIGENT PARK AND PAGE FUNCTIONS IN A COMMUNICATION SYSTEM

FIELD OF THE DISCLOSURE

Embodiments of the present disclosure relate generally to communications and, in particular, to improved paging functions.

BACKGROUND

Certain communication systems are known to provide a call park process. The call park process begins by transferring a caller to a call park location (e.g., a call park pilot number). When a call is parked, some systems start a park recall timer. When the park recall timer expires, the parked call returns to the device that answered the call, which is sometimes referred to as a recall.

A parked call can be retrieved by devices other than the device that answered the call. For instance, the parked call can be retrieved by another device by checking a park extension at which the call is parked or dialing the park extension at which the call is parked. A parked call may only be retrieved once and subsequent retrieval attempts may be blocked by the communication system.

BRIEF SUMMARY

Embodiments of the disclosure provide improvements to call park and paging functions. In some embodiments, a targeted paging function is implemented, which improves the chances that an appropriate person retrieves the parked call both in a timely manner and in the first instance.

One aspect of the present disclosure is to enable paging with respect to a parked call in an intelligent manner. For instance, when a call is parked, the paging features implemented for the parked call may select a particular set of users (e.g., a group of paging targets), a particular location, or combinations thereof. For example, paging target(s) may be selected based on the caller information, based on information provided by the answering party, and/or based on the extension to which the call is parked. Paging may include playing an audio message from speakers in a predetermined location while not playing the audio message from other speakers not in the predetermined location. Paging may also include sending specific and directed push notifications to user devices of selected paging targets. When implemented in combination with one another, the proposed paging functions can help notify the appropriate paging targets of the parked call and increase the chances that the parked call will be retrieved by the correct paging target before a park recall timer expires.

In a more specific, but non-limiting, example assume that a call is received for Dr. Z. The call is initially answered by an operator at a call answering device. The operator may park the call in a park box with a Direct Inward Dialing (DID) number that is accessible from anywhere. The operator may further input Dr. Z's mobile number and the park box information (e.g., the DID number or a park box identifier) into a paging application. Based on the information provided by the operator, the paging application may locate an area of a building (e.g., a hospital) in which Dr. Z is located. The paging application may automatically play an audio announcement using speakers in proximity to the located area (e.g., within an audible distance of the location of Dr. Z). The paging application may also send a push notification to Dr. Z's user device based on the mobile number input by the operator. If a park recall timer expires before Dr. Z retrieves the call, the paging application may repeat the audio announcement and push notification a fixed number of times. If Dr. Z still does not retrieve the call, the paging application may send the audio announcement to a wider area (e.g., by using more speakers than were used in the original audio announcement).

An additional variation of this feature can be achieved using mobile push notifications, assuming the paging target has a mobile device. With the mobile push notification feature enabled, the attendant can park the call and the system can notify the called party's extension via a push notification. So, in one option, the "page" part of the proposed solution can be based on a mobile push notification. In another configuration, the page happens normally, out of band, followed by an outdial by the park system.

In some embodiments, push notifications are provided over a mobile network, so the parking and paging system may utilize the phone identifier and mapping between a person and his or her device. As a more specific, but non-limiting example, a nurse call application of a park and page may be configured to page by SMS (e.g., including the park box on which to retrieve the call that is parked).

In some embodiments, proximity can also be taken into consideration so that the paging does not extend to a whole building or a large area that includes areas the paged person is not likely to be or known to not be. Alternatively or additionally, the paging can be specific to a set of people in a certain area, and not necessarily one person (e.g., paging any nurse working for Dr. X, rather than a specific nurse, to pick up a call).

As a non-limiting example, consider a scenario where operator gets a call for a doctor because someone has fainted. The operator parks the call in a park box with a DID number accessible from anywhere. The operator then enters a special number for any on-call doctor and the park box into a paging application. The paging application then locates the region where the on-call doctors are located, and plays an audio announcement in just that area (but not other areas) or sends a push notification to the cell phones, asking one of the doctors to call the park box number. If after a timeout no doctor retrieves the call, the paging application repeats the audio announcement and push notification a fixed number of times. If no doctor returns the call, the paging application sends the audio announcement to a wider area.

In some embodiments, the disclosed park and paging system may be configured to operate in a manner that is targeted based on proximity. As an example, the park and paging system may be location based (which may leverage beacons)—something with fine amount of location precision. The park and paging system may be configured to identify a device as a device in a location. The device says, "I am in this area." It may also be possible to consider a scenario where it is desired to page a subset of people. In such a scenario, an application may be provided on the device and the device is configured to periodically check in (with location information) and then provide a User Interface (UI) that enables a person to respond to a parking page. In some embodiments, this may involve pushing a simple message or may push the page notification instead.

In some embodiments, a park and paging system may also be configured to leverage aspects of geofencing. As an example, it may be possible to detect that a mobile client is moving out of a geofenced area. In response to making such a determination, the park and paging system may be configured to turn off push notifications so that the person who is walking out of the fenced zone does not get page notifications. As a non-limiting example, consider a hospital customer provided with a mobile notification solution, where nurses use mobile devices with an appropriate application to receive push notifications for incoming calls. It may be desirable for a nurse not to receive hospital-related calls on their application/mobile device if they are outside a geo-fenced area (e.g., a radial perimeter beyond a hospital). Embodiments of the present disclosure contemplate disabling a push notification on the server side for clients that are outside the geo-fenced range. In a sense, the paging concept is similar to this hospital scenario.

As of today, there is not a way to for a client (e.g. a User Device) to deny incoming push notifications nor is there a way for an application (e.g. a Presence Server) to detect that push notifications have been delivered until the client signals back to the application. This proposes that the client checks its location before alerting the user of a page and also, if active, signals the application when it leaves or enters a particular fenced area. The client can use the various approaches described herein to determine this so that the client does not have to constantly share its location with the application which is a privacy concern. The application will know only when clients are in a particular covered area, and not know where they are when they are not. This means that a push notification will still be sent to clients outside of the fenced area to wake it up to determine if the client is still outside the area. Considering the foregoing, embodiments of the present disclosure contemplate a process where the proposed solution extends an area or audience if there are no targets available. With existing technology, there can be a step to extend the audience if the call is not joined within a certain time period.

In light of the above, one aspect of the present disclosure provides a call park and paging system that includes:
 a processor; and
 computer memory coupled with the processor, wherein the computer memory comprises data that, when processed by the processor, enables the processor to:
  park a call received from a caller;
  provide a page in a first target area in an attempt to summon a paging target to retrieve the parked call;
  after paging the first target area, automatically provide an additional page in a second target area that is different from the first target area in an attempt to summon the paging target to retrieve the parked call;
  receive a response from the paging target; and
  based on the response received from the paging target, connect the paging target with the caller.

In another example, the present disclosure provides a computer readable medium comprising a set of instructions stored therein which, when executed by a processor, enable the processor to implement a park and page function, the instructions including:
 instructions that park a call received from a caller;
 instructions that provide a page in a first target area in an attempt to summon a paging target to retrieve the parked call;
 instructions that, after a predetermined amount of time and/or after a predetermined number of paging attempts in the first target area, provide an additional page in a second target area that is different from the first target area in an attempt to summon the paging target to retrieve the parked call;
 instructions that receive a response from the paging target; and
 instructions that, based on the response received from the paging target, connect the paging target with the caller.

In another example, the present disclosure provides a method, comprising:
 receiving a call from a caller;
 parking the call;
 while the call is parked, determining a paging target for the call;
 paging a first target area in an attempt to summon the paging target to retrieve the parked call;
 after a predetermined amount of time and/or after a predetermined number of paging attempts have been provided in the first target area, paging a second target area that extends beyond the first target area in an attempt to summon the paging target to retrieve the parked call;
 receiving a response from the paging target; and
 based on the response received from the paging target, connecting the paging target with the caller.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments of the disclosure provide systems and methods for enhancing park and page functions in a communication system. The disclosed systems and methods may be provided in various combinations. For instance, variations and combinations of the methods described herein may be performed at one or multiple different components of a communication system.

Figure 1:
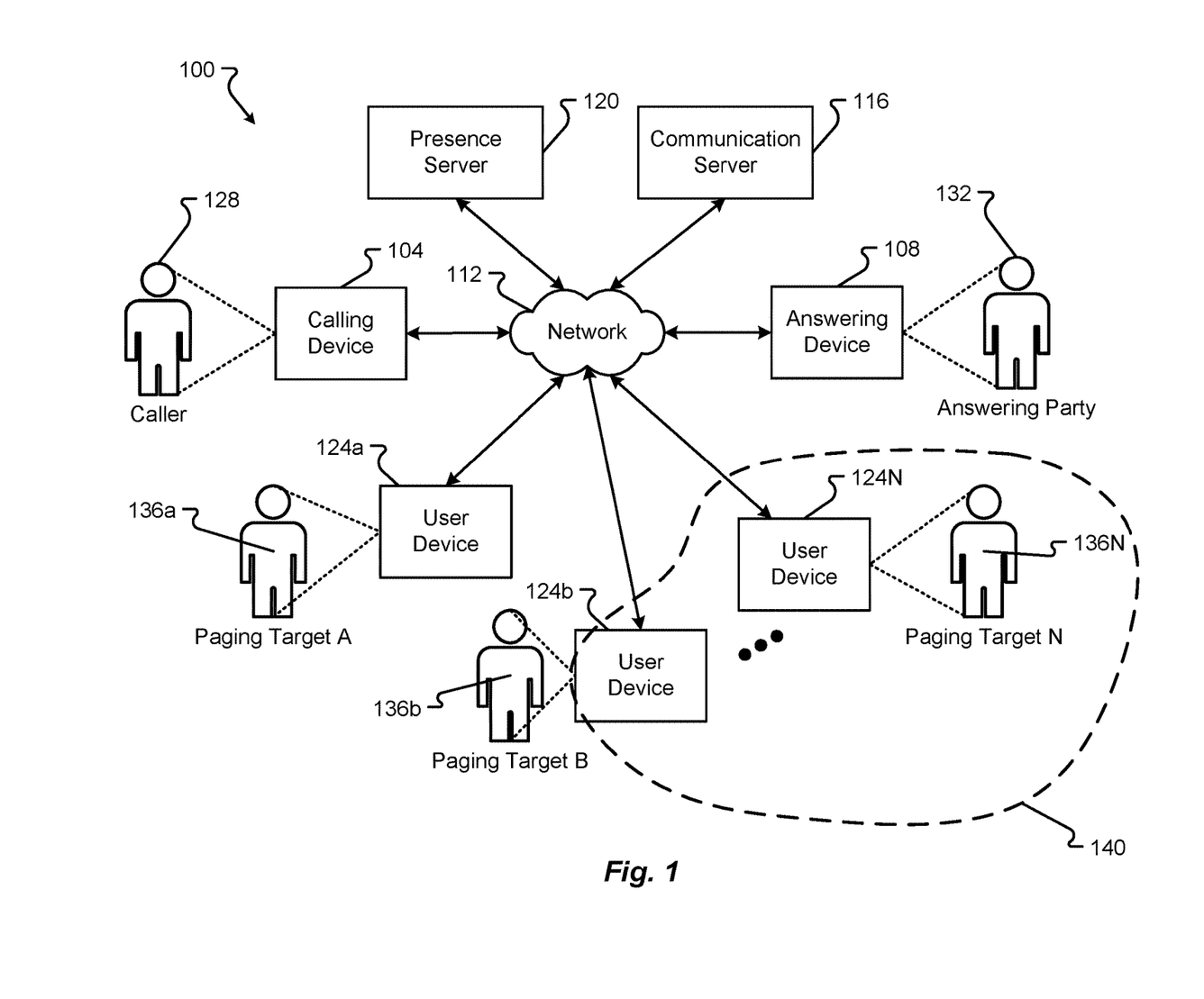
FIG. 1 is a block diagram illustrating components of a communication system according to one embodiment.

With reference now to FIG. 1, an illustrative communication system 100 will be described in accordance with at least some embodiments of the present disclosure. As shown in FIG. 1, the system 100 may include a calling device 104, an answering device 108, and a plurality of user devices 124a-N. The devices 104, 108, 124a-N may correspond to the same type of devices (e.g., various forms of communication devices), but may be associated with different users/entities. For instance, the calling device 104 may be associated with a caller 128 or calling entity. The answering device 108 may be associated with an answering party 132. The user devices 124a-N may be associated with different users, which may correspond to different paging targets 136a-N as will be discussed in further detail herein. Although each user device 124a-N is depicted as being associated with a particular paging target 136a-N, it should be appreciated that a single user device 124 may be associated with a number of paging targets 136a-N or a number of user devices 124a-N may be associated with a single paging target 136. For instance, but without limitation, a user device 124 may be associated with a group of paging targets 136a-N.

In one non-limiting embodiment, one, some, or all of the devices 104, 108, 124a-N may be similar in their communication capabilities, but such a configuration is not required. In other embodiments, at least some of the devices 104, 108, 124a-N may be different or have different capabilities from other devices 104, 108, 124a-N. As a non-limiting example, the user devices 124a-N may correspond to mobile communication devices (e.g., smartphones, tablets, wearable devices, etc.) that are carried by users, which will be referred to as paging targets 136a-N. An answering device 108 may also correspond to a mobile communication device or any other type of communication device.

The various devices 104, 108, and 124a-N may communicate with one another via a communication network 112 or may communicate directly with one another using various types of known communication protocols (e.g., NFC, Bluetooth, etc.). The communication network 112 may include a cellular or other wireless network and the devices 104, 108, 124a-N can include smartphones, tablets, laptop computers, wearable devices, personal computers, telephones, SIP phones, softclients, applications on a communication device, any fixed communication device, or any other portable electronic device configured to communicate over the network 112. It should be understood that while only three user devices 124 are illustrated here for the sake of simplicity, any number of devices of different types may be connected with the network 112 at any given time or may be in direct communication with one another at any given time. Moreover, the constitution of the types of devices connecting to the network 112 and to each other may also vary over time.

The network 112 can also include an Internet Protocol (IP) Multimedia Subsystem (IMS) framework providing Internet and/or other data services to the devices 104, 108, 124a-N over the network 112. Generally speaking, the IMS framework of the network 112 can utilize Session Initiation Protocol (SIP) and/or other Internet Engineering Task Force (IETF) standard protocols to provide any number of IP multimedia services including but not limited to Voice over IP (VoIP) calling, media streaming, web access, etc. Alternatively or additionally, the network 112 may include a distributed computing network such as the Internet or some other packet-based communication network.

The communication system 100 may further include a communication server 116 and a presence server 120. The communication server 116 and presence server 120 may cooperate to provide improved park and page functions as described herein. As an example, the communication server 116 may be configured to receive calls initiated by a calling device 104 (or placed on hold by the answering device 108) and park the calls at a predefined parking location. Examples of traditional park and page functions that may be performed by the communication server 116 are described in U.S. Pat.

No. 7,801,743, the entire contents of which are hereby incorporated herein by reference.

The communication server 116, in some embodiments, may further be configured to interface with the presence server 120 to obtain presence information (e.g., communication activity, location information, login status, etc.) for one, some, or all of the paging targets 136a-N. In some embodiments, the presence information for a paging target 136a-N may be based upon whether or not the paging target 136a-N is logged into the communication server 116 and/or registered a presence with the presence server 120. Alternatively or additionally, the presence information for a paging target 136a-N may be based upon a determined location or communication activity (e.g., on hold, on a call, busy, etc.) of a user device 124a-N that is associated with a particular paging target 136a-N. For instance, if a location of the first user device 124a is determined to be outside of a predetermined boundary (e.g., a geofenced area 140), then the paging target A 136a may be determined to be outside the geofenced area 140 and the presence information for the paging target A 136a may indicate that the paging target A 136a will not likely be reached with a page provided in the geofenced area 140. On the other hand, if a location of the second user device 124b is determined to be inside of the predetermined boundary (e.g., the geofenced area 140), then the paging target B 136b may be determined to be inside the geofenced area 140 and the presence information for the paging target B 136b may indicate that the paging target B 136b may likely be reached with a page provided in the geofenced area 140. As paging targets 136a-N (or their user devices 124a-N) move into and out of the geofenced area 140, the presence server 120 may update appropriate presence information for the paging targets 136a-N. In some embodiments, an Application Programming Interface (API) may be provided in the presence server 120 to enable the communication server 116 to subscribe to subscription services of the presence server 120. As an example, the communication server 116 may request presence information about certain paging targets 136a-N as needed (e.g., a pull model) or the presence server 120 may push updates to presence information for certain paging targets 136a-N based on an identification of which paging targets 136a-N are of interest to the communication server 116.

While the system 100 of FIG. 1 illustrates a single geofenced area 140, it should be appreciated that the system 100 may be configured to include a plurality of geofenced areas 140 (some of which overlap with others). As an example, the system 100 may include at least a first area and a second area that partially or totally overlaps with the first area. The boundary of the first area and/or second area may be defined by geofencing or may be defined as a room or number of rooms in a building.

Figure 2:
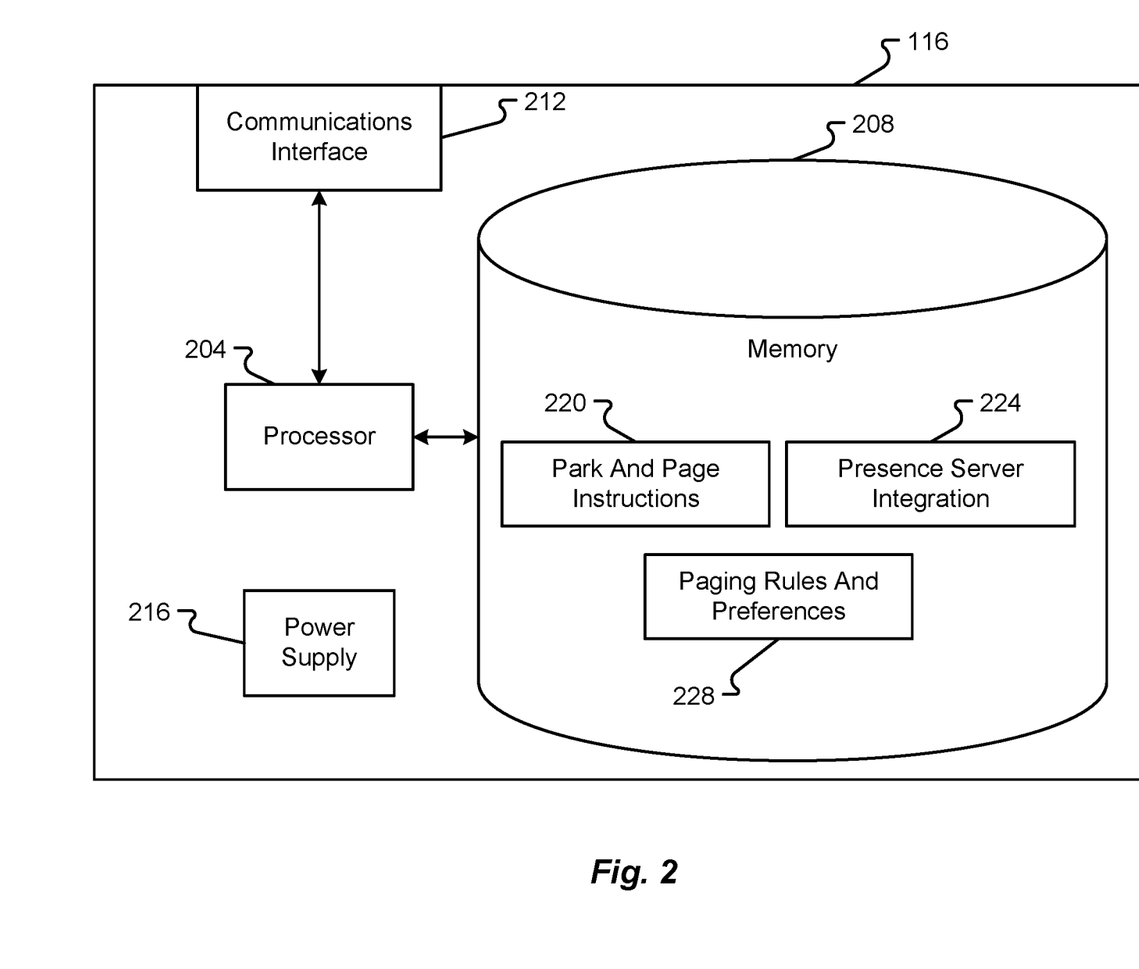
FIG. 2 is a block diagram illustrating components of a communication server according to one embodiment.

With reference now to FIG. 2, additional details of a communication server 116 will be described in accordance with at least some embodiments of the present disclosure. Although the communication server 116 was illustrated as a single device in FIG. 1, it should be appreciated that the functionality of the communication server 116 described herein may be distributed across a number of servers, clouds, clusters, virtual machines, or computing resources. In other words, the functions of the communication server 116 should not be construed as being limited to a single server device although such a configuration is possible.

The illustrative communication server 116 is shown to include a processor 204, memory 208, a communication interface 212, and a power supply 216. In some embodiments, all of the communication server 116 are provided within a common device housing and are connected via a one or multiple circuit boards.

The processor 204 may correspond to one or multiple processing circuits. In some embodiments, the processor 204 may include a microprocessor, an Integrated Circuit (IC) chip, an ASIC, or the like. The processor 204 may be configured with a plurality of logic circuits or circuit elements that enable the processor 204 to execute one or more instructions or instruction sets maintained in memory 208. Alternatively or additionally, the processor 204 may be configured to execute instructions received via the communications interface 212. As an example, the processor 204 may be configured to execute one or more drivers that are specifically provided for the communications interface 212.

The memory 208 is shown to be in communication with the processor 204. The memory 208 may include any type or combination of computer memory devices. Non-limiting examples of memory 208 include flash memory, volatile memory, non-volatile memory, RAM, NVRAM, SRAM, ROM, EEPROM, etc. As can be appreciated, the types of devices used for memory 208 may depend upon the nature and type of data stored in memory 208.

In the depicted embodiment, the memory 208 includes park and page instructions 220, presence server integration instructions 224, and paging rules and preferences 228. Illustratively, the park and page instructions 220 may correspond to instructions that, when executed by the processor 204, enable park and page functionality to be provided by the communication server 116. In some embodiments, the park and page instructions 220 may include parking locations for calls to be parked (e.g., dedicated parking lines, ports, memory resources, etc.). The park and page instructions 220 may also be configured to implement intelligent paging functions as will be described herein. For instance, the park and page instructions 220 may reference the paging rules and preferences 228 in connection with performing paging for a call received from a caller 128. The paging rules and preferences 228 may be specific to a particular paging target, particular to a group of paging targets (e.g., a type of person, a skill, etc.), particular to a caller 128, particular to a call type (e.g., an emergency call as compared to a consult call), particular to a time of day, etc.

In some embodiments, the paging rules and preferences 228 may include a presence component. The paging rules and preferences 228 may define that a particular paging target 136a-N be paged or receive a push notification under certain presence-based circumstances. In such a situation, the park and page instructions 220 may further call the presence server integration instructions 224 to obtain presence information for a paging target 136a-N, a group of paging targets, or the like. In some embodiments, the presence server integration instructions 224, when executed by the processor 204, may enable the park and page instructions 220 to obtain and process location and/or presence information for certain paging targets 136a-N. The location and/or presence information for paging targets 136a-N may be used to comply with or implement some of the paging rules and preferences 228.

The communications interface 212 provides hardware and drivers that enable the communication server 116 to connect with the network 112, receive communications from the network 112, and/or provide communications to the network 112 for delivery to another network-connected device. It should be appreciated that the communications interface 212 may include one or multiple different interfaces that facilitate different kinds of wireless and/or wired connectivity. In some embodiments, the communications interface 212 includes a wired and/or wireless network adapter. Non-limiting examples of a communications interface 212 include an antenna and associated driver (e.g., a WiFi or 802.11N antenna and/or driver), an Ethernet card and/or driver, a serial data port (e.g., a USB port) and/or driver, a Bluetooth or BLE antenna and/or driver, an NFC antenna and/or driver, or any other type of device that facilitates inter-device communications. The communications interface 212 may receive one or more data packets or messages from the communication network 112 and extract data therefrom. The data extracted from the received data packets or messages may be provided to the processor 204 where the data can subsequently be processed using instructions stored in memory 208.

The power supply 216 may correspond to an internal power source and/or adapter for connection with an external power source. In the example of an internal power source, the power supply 216 may correspond to a battery or cell of batteries used to power the various other components of the communication server 116. Alternatively or additionally, the power supply 216 may include a power converter or power conditioner that enables power received from an external source (e.g., a 120V AC power source) to be converted into useable DC power that can be supplied to the various components of the communication server 116.

Figure 3:
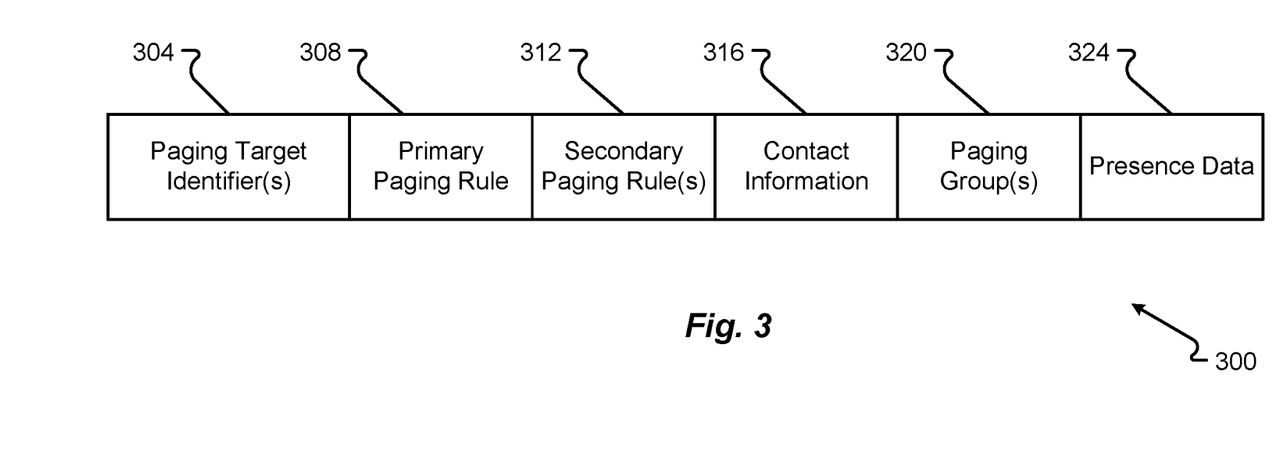
FIG. 3 is a block diagram depicting a data structure used in connection with providing improved park and page functions according to one embodiment.

With reference now to FIG. 3, details of a data structure 300 used to implement improved park and page functions will be described in accordance with at least some embodiments of the present disclosure. The data structure 300 may be stored in a single data storage location (e.g., a centralized database) or among a plurality of storage media (e.g., as a distributed ledger, among a Distributed Storage Network (DSN), in a cloud computing environment, etc.). In some embodiments, portions of the data structure 300 may be provided within the paging rules and preferences 228.

Examples of the data fields that may be provided in data structure 300 include, without limitation, a paging target identifier(s) field 304, a primary paging rule field 308, second paging rule(s) field(s) 312, a contact information field 316, a paging group(s) field(s) 320, and a presence data field 324. The paging target identifier(s) field 304 may be used to store information that describes a particular paging target 136a-N or a user device 124a-N associated with a paging target 136a-N. As some non-limiting examples, the paging target identifier(s) field 304 may store identification information such as a username, Address of Record (AoR), email address, first name, last name, user title, user handle, nickname, etc. In some embodiments, a row in the data structure 300 may be used for a particular user, which means that the user can be identified (partially or completely) with information from the paging target identifier(s) field 304.

The primary paging rule field 308 may store information that describes rules or conditions to be applied by the park and page instructions 220 when first trying to page or reach a paging target. The secondary paging rule(s) field(s) 312, in comparison, may store information that described rules or conditions to be applied by the park and page instructions 220 may trying to page or reach a paging target after the primary paging rules have been applied, without success. For instance, the park and page instructions 220 may first implement a paging and/or push notification process based on the information contained in the primary paging rule field 308. If the paging target does not retrieve the parked call within a predetermined amount of time of implementing the rules defined in the primary paging rule field 308, the park and page instructions 220 may implement a second, third, fourth, or fifth paging and/or push notification process based on the information contained in the secondary paging rule(s) field(s) 312.

The contact information field 316 may include information that can help the park and page instructions 220 implement any number of paging and/or push notification processes. For instance, the contact information field 316 may include a phone number, mobile number, text address, pager number, social media username, email address, IP address, etc. The contact information field 316 may alternatively or additionally include information enabling pages to be specifically directed at a paging target 136a-N (e.g., shift locations, business units, scheduled meetings, etc.). The contact information field 316 may be used by the park and page instructions 220 to target paging attempts to a particular area and/or target push notifications at a specific user device 124a-N known to be associated with a paging target 136a-N.

The paging group(s) field(s) 320 may include information describing a group or number of groups to which a particular paging target 136a-N belongs. For instance, a paging target 136a-N may belong to a particular user group, a particular skill group, a particular hunt group, or some other collections of users. Some or all of these groups may be targeted by the park and page instructions 220 during a paging and/or push notification process, depending upon the nature of the call.

As the communication server 116 may be configured to receive and/or retrieve presence information for paging targets 136a-N from the presence server 120, the communication server 116 may also be allowed to store presence information for a paging target 136a-N within the presence data field 324. As a paging target's 136a-N presence information changes (e.g., in response to movement of the paging target 136a-N, in response to changes in communication status, in response to changes in availability, etc.), the information stored in the presence data field 324 may be updated for ease of reference by the park and page instructions 220.

With reference now to FIGS. 4-7, various methods of facilitating advanced park and page functions will be described in accordance with at least some embodiments of the present disclosure. While various methods and method steps will be described as being performed by a particular component of a system 100, it should be appreciated that any component or collection of components depicted and described herein can perform any combination of method steps depicted and described herein. Additionally, it should be appreciated that any method can be combined with any method or any method step can be combined with any step from any other method without departing from the scope of the present disclosure. The steps may be performed in any order or may be performed in parallel with one another.

Figure 4:
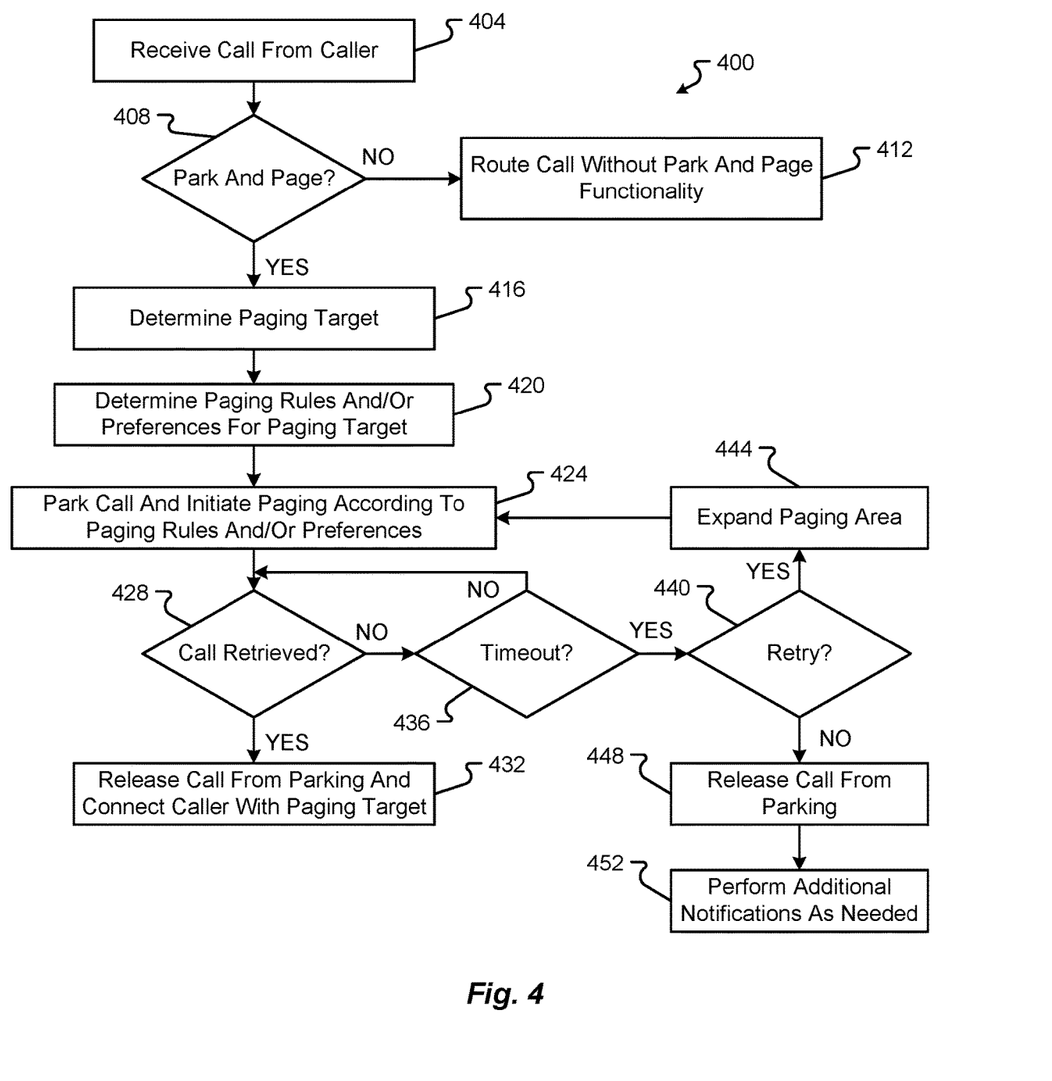
FIG. 4 is a flow diagram depicting a first communication method according to one embodiment.

With reference now to FIG. 4, an illustrative communication method 400 will be described in accordance with at least some embodiments of the present disclosure. The method 400 begins when a call is received from a caller 128 (step 404). The call may correspond to a voice call, a video call, a social media interaction, a web collaboration, or any combination thereof.

The call may be received at an answering device 108 that is being operated by an answering party 132. Upon receiving the call, the answering party 132 may determine that they are unable to assist the caller 128 with their issue or address a question raised by the caller 128 (step 408). If the answering party 132 can directly route the caller to the desired callee (e.g., by forwarding or transferring the call), then the answering party 132 may route the call without implementing a park and page function of the system 100 (step 412).

If, however, a park and page function is desired as an alternative to call forwarding, the answering party 132 may initiate a park and page process. As part of the park and page process, the caller 128 may be placed on hold and the call may be assigned to a park line (step 424). For instance, the answering party 132 may park the call in a park box with a DID number accessible from any device connected to the communication network 112. The park and page process may also include identifying one or more paging targets 136*a*-N (step 416) and then invoking the park and page instructions 220 to determine paging rules and preferences 228 for the paging target(s) 136*a*-N (step 420). As an example, the answering party 132 may enter a special number for any paging target 136*a*-N and the park box into a park and page application made available to the answering device 108 via the communication server 116 implementing the park and page instructions 220.

The method will continue by determining if the call has been retrieved (step 428). This query may be answered affirmatively if the call is retrieved from the call park box within a predetermined amount of time and/or before a predetermined number of paging attempts have been performed according to the primary paging rule(s) defined for the paging target 136*a*-N. Specifically, but without limitation, while the call is parked the paging target(s) 136*a*-N identified in step 416 may try to be summoned by providing a paging attempt in a first target area. Paging may include announcing a message via a public address system in a first target area (e.g., a collection of speakers in a first predetermined area). The message may include instructions for a paging target to retrieve the parked call and may further identify a location where the call has been parked (e.g., "A call is waiting at extension 101 for a shipping representative" or "Dr. Z, please dial extension 700").

If after a predetermined amount of time has passed since the first paging attempt in the first target area and/or after a predetermined number of paging attempts have been provided in the first target area (step 436), the method 400 may continue by determining if the paging area should be expanded because a paging retry is desired (step 440). As suggested by step 436, the predetermined amount of time may be reached after the predetermined number of paging attempts have been provided in the first target area without the paging target responding or retrieving the call from the parking location. In some examples, the predetermined amount of time begins when the page is provided in the first target area and expires after the predetermined number of paging attempts in the first target area have been performed without the paging target retrieving the parked call. It should be appreciated that the decision made in step 440 (e.g., the decision on whether or not to retry the paging process) may be based upon the primary paging rule 308, one or more secondary paging rule(s) 312, and/or a preference defined by the caller 128. For instance, the caller 128 may be able to control how long they wait on hold or have their call parked. The caller 128 could define such preferences when the call is answered by the answering device 108, while the call is parked, after the call has been parked for a predetermined amount of time, etc. The caller 128 could be provided with an option to be unparked and returned to the answering party 132 or the caller 128 could simply hang up, causing the process to end. In other words, the caller 128 may be provided with some level of control over how long their call remains parked.

If a paging retry is desired for a broader or different paging area, then the method 400 may continue by expanding the paging area (step 444) and determining new paging rules and preferences for the next paging attempt (step 424). As a non-limiting example, if a paging retry is desired and the call is still parked and waiting for retrieval, the method 400 may continue by paging a second target area that extends beyond the first target area in an attempt to summon the paging target 136*a*-N (or a new paging target) to retrieve the parked call. The first target area and/or the second target area may be selected based on a determined location of a user device 124 associated with the paging target 136. In some embodiments, the second target area includes the first target area and an additional area that extends beyond the first target area. It should be appreciated, however, that the second target area does not have to overlap with the first target area.

If the call is eventually answered (e.g., the parked call is retrieved from the parking location) as determined at step 428, then the method 400 may continue by releasing the call from the parking area and connecting the caller 128 with the paging target 136 that answered the parked call (step 432). As an example, the calling device 104 may be connected with the user device 124 of the paging target 136 that retrieved the call from the parking location.

If, however, the call is not answered after a timeout and no additional paging attempts are desired, then the method 400 may continue by releasing the call from parking (step 448). The method 400 may cause the call to revert back to the answering device 108 where the answering party 132 is able to perform additional notifications as needed (step 452) or try to address the caller's 128 issues to the best of the answering party's 132 ability.

Figure 5:
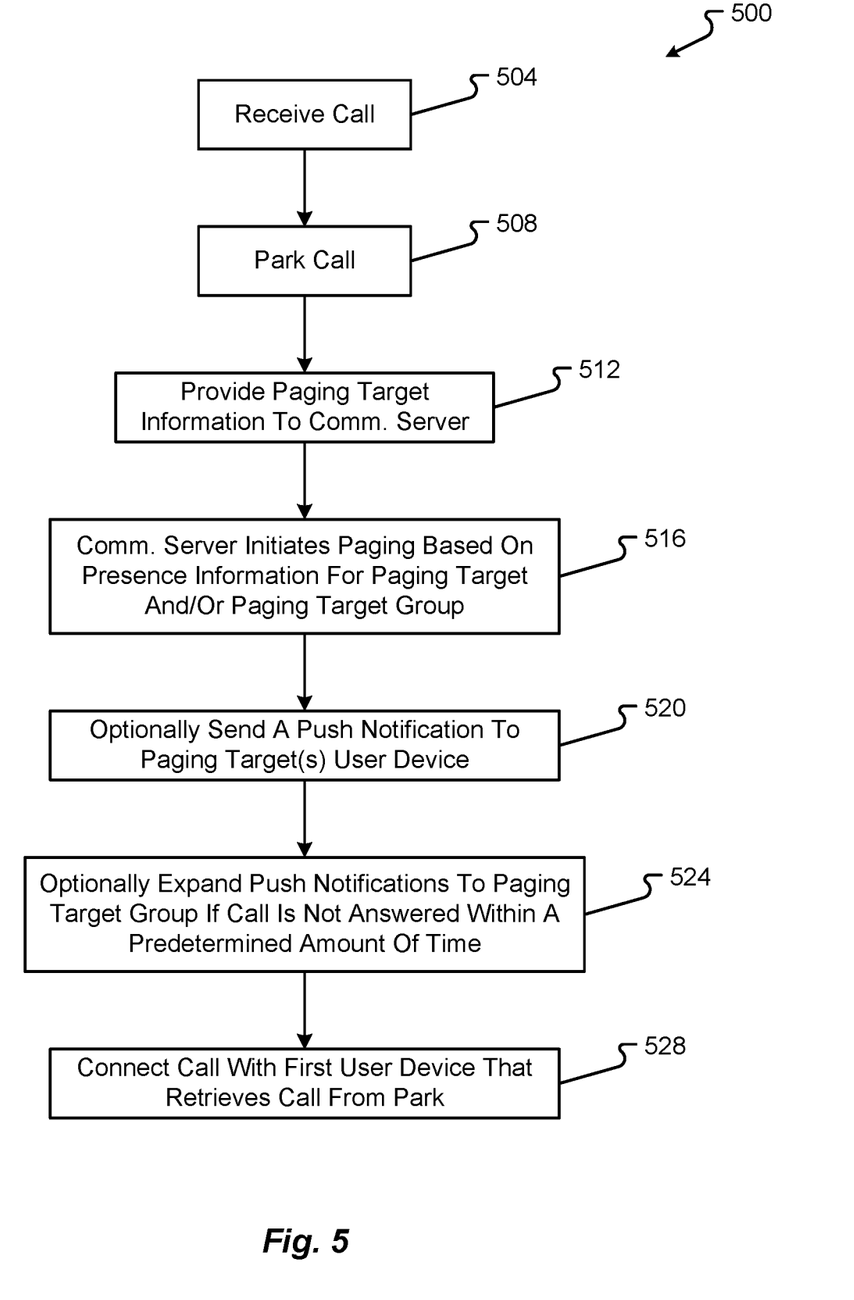
FIG. 5 is a flow diagram depicting a second communication method according to one embodiment.

Referring now to FIG. 5, another communication method 500 will be described in accordance with at least some embodiments of the present disclosure. The method 500 begins when a call is received (step 504). The call may be received at an answering device 108 and/or communication server 116 and then the call may be parked by the answering party 132 (step 508). Before, after, or while the call is being parked, the method 500 may further include providing paging target information to the communication server 116 (step 512). The paging target information provided to the communication server 116 may include an identification of a particular paging target 136, an identification of a paging target group, an identification of a location in which any available paging target will be suitable, an identification of a paging target's 136 user device 124, etc.

Upon receiving the paging target information, the communication server 116 may invoke the park and page instructions 220 to initiate a paging process (step 516). The paging process may be performed in accordance with paging rules and preferences 228, which may define a paging process that is based on presence information for the paging target. The paging rules and preferences 228 may also define that the paging target 136 can be paged using a push notification. In such a situation, the paging process may optionally include generating and sending a push notification to a user device 124 of the paging target 136 (step 520).

The method 500 may also include an optional step in which push notifications are expanded to a larger paging target group if the call is not answered within a predetermined amount of time (step 524). As an example, if the initial paging target does not respond to the paging and/or push notification attempts, then a paging target group that includes the initial paging target and more paging targets may be identified and paged using a targeted paging and/or push notification process. The method 500 may resolve when any paging target retrieves the call from the parking location and the caller 128 is connected with the answering paging target (step 528).

Figure 6:
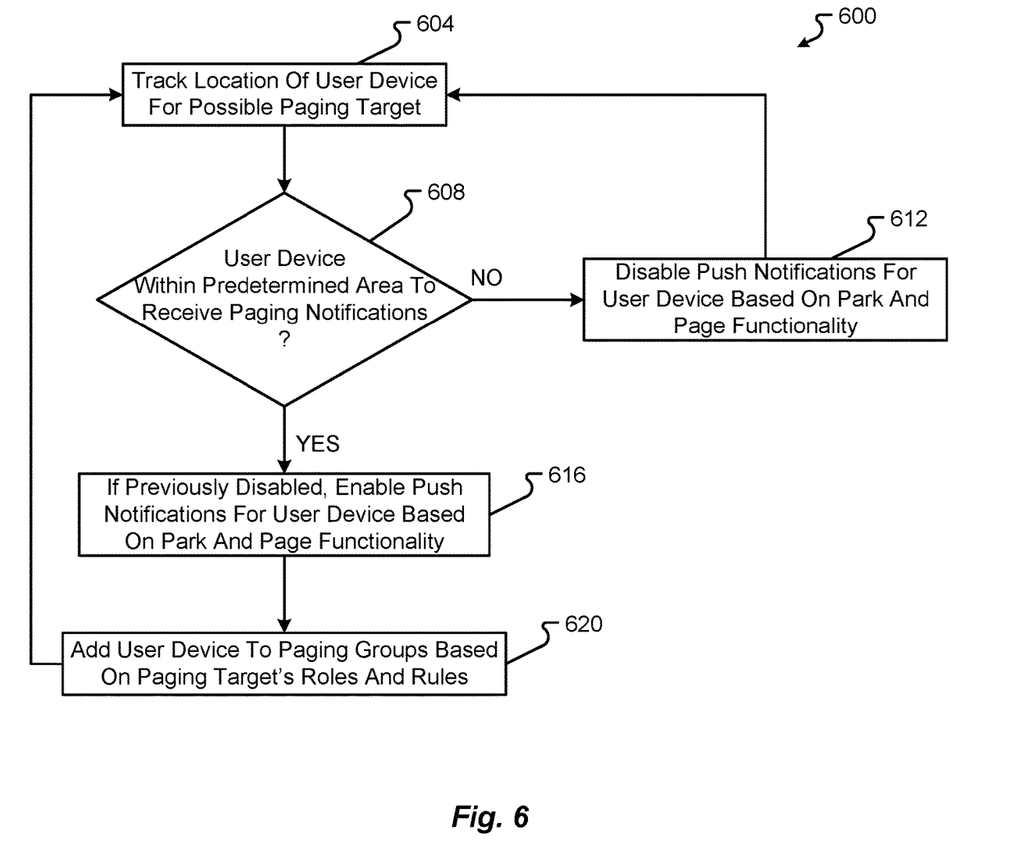
FIG. 6 is a flow diagram depicting a third communication method according to one embodiment.

With reference now to FIG. 6, another communication method 600 will be described in accordance with at least some embodiments of the present disclosure. The method 600 begins when a communication server 116 is enabled to track a location of a user device 124 that is associated with a potential paging target (step 604). The location of the user device 124 may be tracked with the assistance of the presence server 120, which may have access to location and/or network connection information for the user device 124.

With access to the location information for the user device 124, the park and page instructions 220 may be configured to determine whether the user device 124 is within a predetermined area that qualifies the user device 124 to receive paging notifications (step 608). For example, the park and page instructions 220 may refer to paging rules and preferences 228 that define a paging target 136 as being eligible for paging only if the user device 124 of the paging target 136 is within a geofenced area 140. If the paging rules and preferences 228 require the paging target 136 to be within a predetermined area, but the user device 124 is determined to be outside the predetermined area, the method may continue by disabling push notifications for the user device 124 based on implementing the paging and push notification process (step 612).

However, if the user device 124 is found to be within the predetermined area, the method 600 may continue by enabling push notifications for the user device 124 and paging target 136 associated with the user device 124 if push notifications were previously disabled (step 616). The method 600 may also include the park and page instructions 220 adding the paging target 136 to one or more appropriate paging groups based on the paging target's roles and skills (step 620). With the paging target 136 now available for paging, the user device 124 of the paging target 136 may be considered a candidate for receiving push notifications based on implementing park and page functions.

Figure 7:
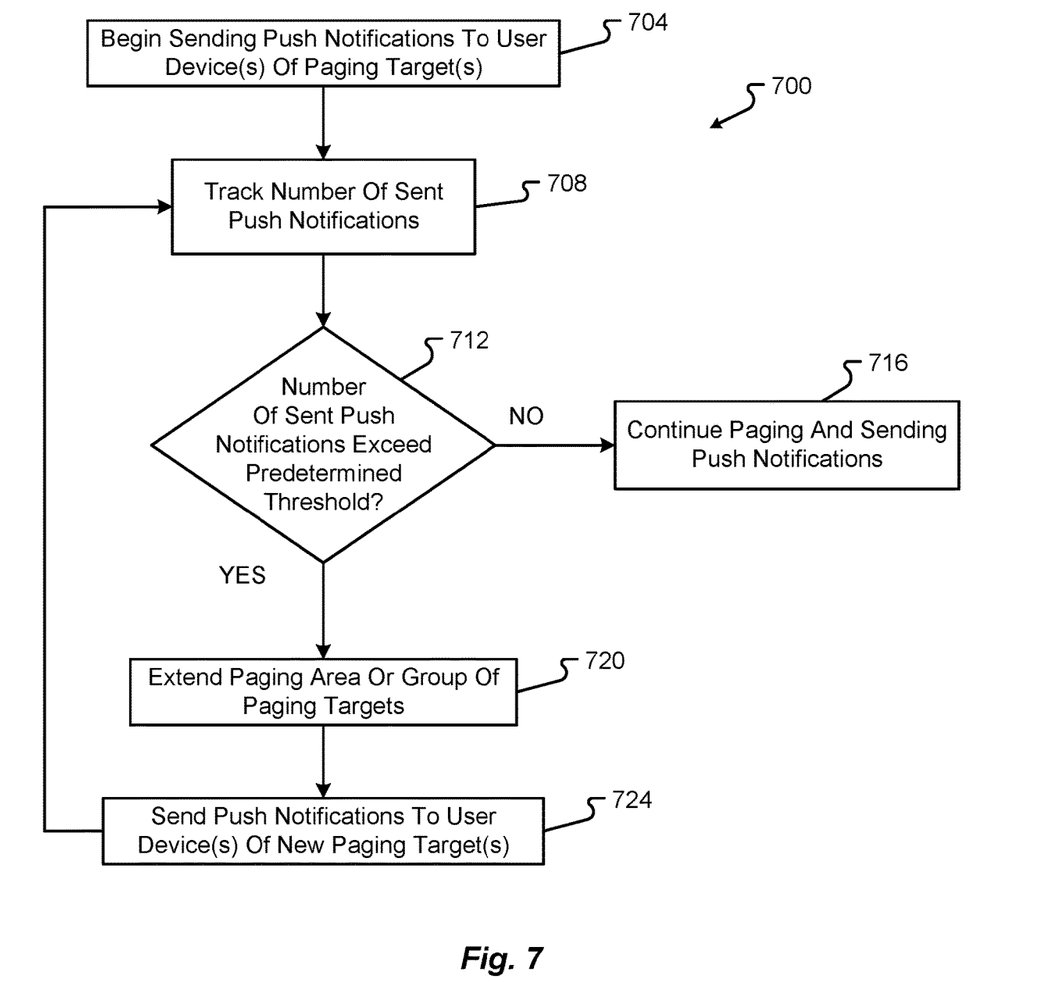
FIG. 7 is a flow diagram depicting a fourth communication method according to one embodiment.

Referring now to FIG. 7, yet another communication method 700 will be described in accordance with at least some embodiments of the present disclosure. The method 700 begins with the park and page instructions 220 sending push notifications to user device(s) 124 of paging target(s) 136a-N in an attempt to summon a paging target to retrieve a parked call (step 704). The park and page instructions 220 may be configured to track a number of sent push notifications (step 708). The park and page instructions 220, in some embodiments, may track the number of push notifications sent and may further track whether or not some of the push notifications were directed toward paging targets 136 located outside a predetermined area. If push notifications are being sent to paging targets 136 located outside the predetermined area, the park and page instructions 220 may determine or assume that the user devices 124 associated with the paging targets 136 could possibly be ignoring the push notifications (e.g., the paging target 136 is not responding to work notifications or the user devices 124 are not notifying the paging target 136 of push notifications received at the user device 124).

As the number of push notifications transmitted is tracked, the park and page instructions 220 may determine if the number of transmitted push notifications has exceeded a predetermined threshold (step 712). If this query is answered negatively, then the park and page instructions 220 may continue sending push notifications (step 716). If the query of step 712 is answered affirmatively, however, the park and page instructions 220 may extend the paging area of group of paging targets 136 (step 720). As an example, the paging area may be extended to include a larger or different target area. Alternatively or additionally, a larger number of paging targets 136 may be selected or a different group of paging targets 136 may be selected. The park and page instructions 220 may then begin sending push notifications to the user device(s) 124 of the new paging target(s) 136 (step 724). In this way, the park and page instructions 220 may be configured to dynamically extend or change the paging audience and/or paging locations (for paging and/or push notifications) thereby increasing the chances that an appropriate paging target 136 will retrieve the parked call.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A call park and paging system, comprising:
a processor; and computer memory coupled with the processor, wherein the computer memory comprises dRev 0data that, when processed by the processor, enables the processor to:

park a call received from a caller;

provide a page directed toward a paging target and in a first target area in an attempt to summon the paging target to retrieve the parked call;

after paging the first target area, automatically provide an additional page directed toward the paging target and in a second target area that is different from the first target area in an attempt to summon the paging target to retrieve the parked call;

identify a communication device associated with the paging target; determine that the communication device is within the second target area;

enable, when the communication device is within the second target area, push notifications on the communication device;

provide a push notification to the communication device associated with the paging target;

determine whether a number of push notifications sent to the communication device associated with the paging target exceeds a predetermined number threshold greater than zero;

extend, when the number of push notifications exceeds the predetermined number threshold, a size of the second target area;

receive a response from the paging target; and based on the response received from the paging target, connect the paging target with the caller.

2. The system of claim 1, wherein the additional page is provided in the second target area after a predetermined amount of time has passed since providing the page in the first target area, and wherein the second target area does not overlap with the first target area.

3. The system of claim 1, wherein the additional page is provided in the second target area after at least two paging attempts have been provided in the first target area, and wherein the additional page is provided in the second target area when the communication device associated with the paging target is positioned within a first geofenced area.

4. The system of claim 1, wherein at least one of the first target area and the second target area is selected based on a determined location of the communication device associated with the paging target.

5. The system of claim 1, wherein the second target area includes the first target area and an additional area that extends beyond the first target area.

6. The system of claim 1, wherein the data, when processed by the processor, further enables the processor to:

determine that the paging target has not responded to the push notification after a predetermined amount of time;

in response to determining that the paging target has not responded to the push notification after the predetermined amount of time, identify additional communication devices associated with other paging targets; and provide the push notification to the additional communication devices associated with the other paging targets.

7. A non-transitory computer readable medium comprising instructions stored therein which, when executed by a processor, enable the processor to implement a park and page function, the instructions including:

instructions that park a call received from a caller;

instructions that provide a page directed toward a paging target and in a first target area in an attempt to summon the paging target to retrieve the parked call;

instructions that, after a predetermined amount of time and/or after a predetermined number of paging attempts in the first target area, provide an additional page directed toward the paging target and in a second target area that is different from the first target area in an attempt to summon the paging target to retrieve the parked call;

instructions that identify a communication device associated with the paging target;

instructions that determine that the communication device is within the second target area;

instructions that enable, when the communication device is within the second target area, push notifications on the communication device;

instructions that provide a push notification to the communication device associated with the paging target;

instructions that determine whether a number of push notifications sent to the communication device associated with the paging target exceeds a predetermined number threshold greater than zero;

instructions that extend, when the number of push notifications exceeds the predetermined number threshold, a size of the second target area;

instructions that receive a response from the paging target; and instructions that, based on the response received from the paging target, connect the paging target with the caller.

8. The non-transitory computer readable medium of claim 7, wherein the predetermined amount of time begins when the page is provided in the first target area and expires after the predetermined number of paging attempts in the first target area have been performed without the paging target retrieving the parked call, and wherein the additional page is provided in the second target area when the communication device associated with the paging target is within a first geofenced area.

9. The non-transitory computer readable medium of claim 7, wherein at least one of the first target area and the second target area is selected based on a determined location of the communication device associated with the paging target, and wherein the second target area does not overlap with the first target area.

10. The non-transitory computer readable medium of claim 7, wherein the second target area includes the first target area and an additional area that extends beyond the first target area.

11. The non-transitory computer readable medium of claim 7, wherein the instructions further include:

instructions that determine that the paging target has not responded to the push notification;

instructions that, in response to determining that the paging target has not responded to the push notification, identify additional communication devices associated with other paging targets; and instructions that provide the push notification to the additional communication devices associated with the other paging targets.

12. The non-transitory computer readable medium of claim 7, wherein the instructions further include:

instructions that track a location of the communication device associated with the paging target; and instructions that control whether or not to provide an alert at the communication device associated with the paging target based on the location of the communication device.

13. A method, comprising:

receiving a call from a caller;

parking the call;

while the call is parked, determining a paging target for the call;

paging the paging target in a first target area in an attempt to summon the paging target to retrieve the parked call;

after a predetermined amount of time and/or after a predetermined number of paging attempts have been provided in the first target area, paging the paging target in a second target area that extends beyond the first target area in an attempt to summon the paging target to retrieve the parked call;

identifying a communication device associated with the paging target;

determining that the communication device is within the second target area;

enabling, when the communication device is within the second target area, push notifications on the communication device;

providing a push notification to the communication device associated with the paging target;

determining whether a number of push notifications sent to the communication device associated with the paging target exceeds a predetermined number threshold greater than zero;

extending, when the number of push notifications exceeds the predetermined number threshold, a size of the second target area;

receiving a response from the paging target; and based on the response received from the paging target, connecting the paging target with the caller.

14. The method of claim 13, wherein the predetermined amount of time is reached after the predetermined number of paging attempts have been provided in the first target area without the paging target providing a response.

15. The method of claim 13, wherein at least one of the first target area and the second target area is selected based on a determined location of the communication device associated with the paging target.

16. The method of claim 13, further comprising:

determining that the paging target has not responded to the push notification;

in response to determining that the paging target has not responded to the push notification after the predetermined amount of time or after the predetermined number of paging attempts, identifying additional communication devices associated with other paging targets; and providing the push notification to the additional communication devices associated with the other paging targets.

17. The method of claim 13, further comprising:

tracking a location of the communication device associated with the paging target; and determining that control whether or not to provide an alert at the communication device associated with the paging target based on the location of the communication device, wherein the alert is provided at the communication device when the communication device is positioned within a first geofenced area.

18. The system of claim 1, wherein the data, when processed by the processor, further enables the processor to:

disable, when the communication device is determined to be outside the second target area, push notifications on the communication device.

19. The non-transitory computer readable medium of claim 7, wherein the instructions further include:

instructions that disable, when the communication device is determined to be outside the second target area, push notifications on the communication device.

20. The method of claim 13, further comprising:

disabling, when the communication device is determined to be outside the second target area, push notifications on the communication device.

* * * * *